(12) United States Patent
Goodsitt et al.

(10) Patent No.: US 11,256,840 B2
(45) Date of Patent: Feb. 22, 2022

(54) RECONFIGURATION OF HARDWARE COMPONENTS OF AN INTEGRATED CIRCUIT

(71) Applicant: Capital One Services, LLC, McLean, VA (US)

(72) Inventors: Jeremy Goodsitt, McLean, VA (US); Austin Walters, McLean, VA (US); Fardin Abdi Taghi Abad, McLean, VA (US); Anh Truong, McLean, VA (US); Vincent Pham, McLean, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 17/084,381

(22) Filed: Oct. 29, 2020

(65) Prior Publication Data

US 2021/0248295 A1 Aug. 12, 2021

Related U.S. Application Data

(63) Continuation of application No. 16/788,157, filed on Feb. 11, 2020, now Pat. No. 10,853,548.

(51) Int. Cl.
*G06F 30/347* (2020.01)
*G06F 111/20* (2020.01)

(52) U.S. Cl.
CPC ........ *G06F 30/347* (2020.01); *G06F 2111/20* (2020.01)

(58) Field of Classification Search
USPC .......................................... 716/117
See application file for complete search history.

(56) References Cited

U.S. PATENT DOCUMENTS

| 2004/0117755 | A1* | 6/2004 | Blodget | G06F 15/7867 716/117 |
| 2009/0213946 | A1* | 8/2009 | Dick | G06F 30/34 375/260 |
| 2011/0099527 | A1* | 4/2011 | Courchesne | G06F 15/7867 716/100 |
| 2021/0248295 | A1* | 8/2021 | Goodsitt | G06F 30/347 |

* cited by examiner

*Primary Examiner* — Mohammed Alam
(74) *Attorney, Agent, or Firm* — Perkins Coie LLP

(57) ABSTRACT

In some embodiments, a client device may obtain an external signal. The hardware components of an integrated circuit of the client device may be reconfigured from a first configuration to a second configuration based on information in the external signal such that one or more portions of the integrated circuit that was previously inaccessible is now accessible and an application may access the one or more portions of the integrated circuit. Further, in response to a trigger, the components of the integrated circuit may reconfigure from the second configuration to the first configuration such that the one or more portions of the integrated circuit is inaccessible.

20 Claims, 7 Drawing Sheets

RECONFIGURATION OF HARDWARE COMPONENTS OF AN INTEGRATED CIRCUIT

CROSS-REFERENCE TO RELATED APPLICATION

This application is a continuation of U.S. patent application Ser. No. 16/788,157, filed Feb. 11, 2020. The content of the foregoing application is incorporated herein in its entirety by reference.

FIELD OF THE INVENTION

The invention relates to reconfiguring one or more hardware components of an integrated circuit based on an external signal.

SUMMARY OF THE INVENTION

Aspects of the invention relate to methods, apparatuses, and/or systems for facilitating reconfiguration of hardware components of an integrated circuit.

One aspect of the disclosure relates to a system for facilitating hardware reconfiguration of components of an integrated circuit, the system comprising circuitry configured to: obtain, by a client device, an external signal; reconfigure hardware components of an integrated circuit of the client device from a first configuration to a second configuration based on information in the external signal such that one or more portions of the integrated circuit that was previously inaccessible is now accessible; access, by an application, the one or more portions of the integrated circuit; and in response to a trigger, reconfigure the components of the integrated circuit from the second configuration to the first configuration such that the one or more portions of the integrated circuit is inaccessible.

Another aspect of the disclosure relates to a method for facilitating hardware reconfiguration of components of an integrated circuit, the method comprising: obtaining, by a client device, an external signal; reconfiguring hardware components of an integrated circuit of the client device from a first configuration to a second configuration based on information in the external signal such that one or more portions of the integrated circuit that was previously inaccessible is now accessible; accessing, by an application, the one or more portions of the integrated circuit; and in response to a trigger, reconfiguring the components of the integrated circuit from the second configuration to the first configuration such that the one or more portions of the integrated circuit is inaccessible.

Another aspect of the disclosure relates to non-transitory computer readable media. The non-transitory computer readable media may store instructions that, when executed by one or more processors, effectuate operations comprising: obtaining, by a client device, an external signal; reconfiguring hardware components of the integrated circuit of the client device from a first configuration to a second configuration based on information in the external signal such that one or more portions of the integrated circuit that was previously inaccessible is now accessible; accessing, by an application, the one or more portions of the integrated circuit; and in response to a trigger, reconfiguring the components of the integrated circuit from the second configuration to the first configuration such that the one or more portions of the integrated circuit is inaccessible.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are illustrated in block diagram form in order to avoid unnecessarily obscuring the embodiments of the invention.

Figure 1:
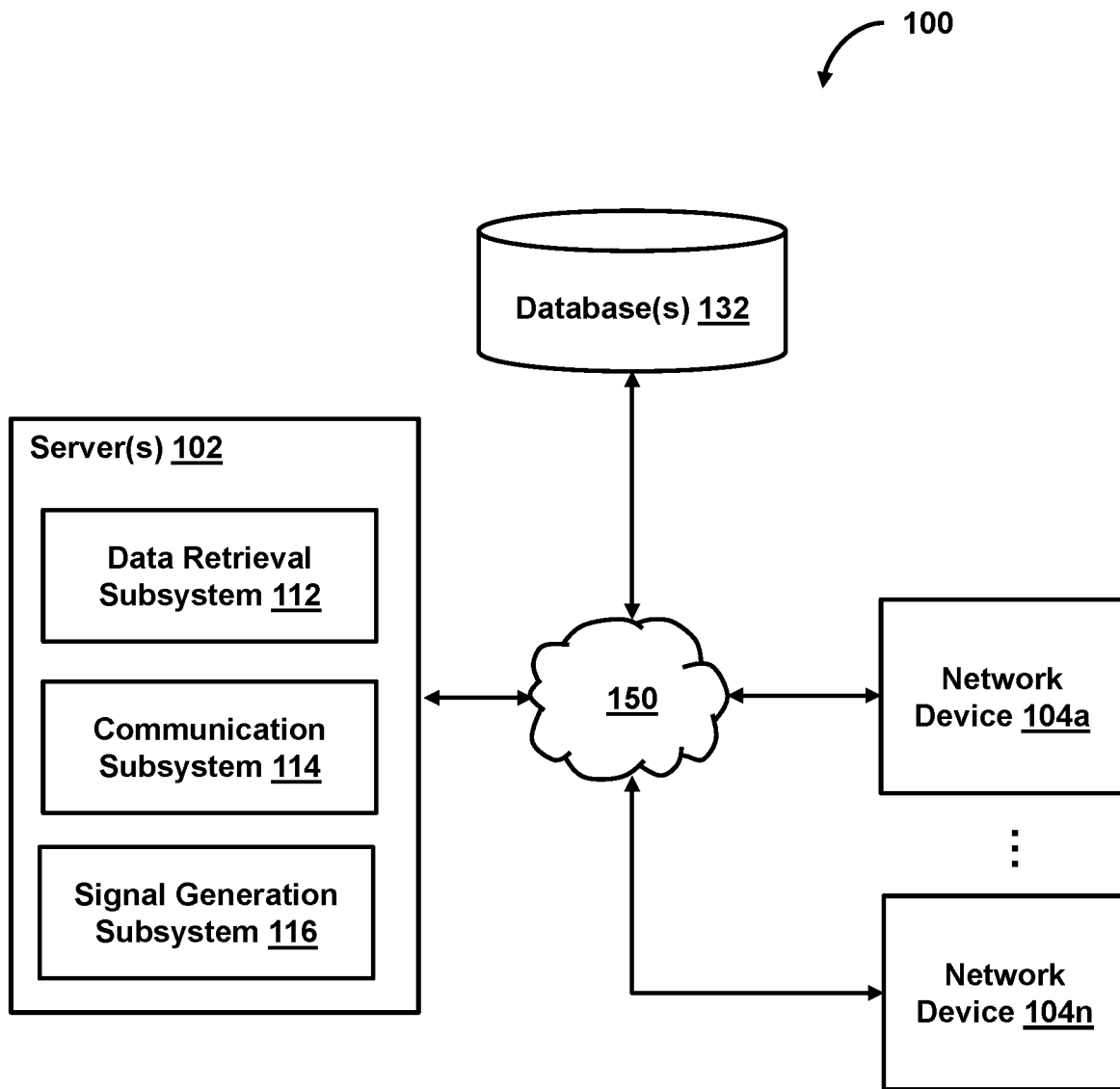
FIG. 1 illustrates a system for configuring interconnections between one or more components of an integrated circuit based on an external signal, in accordance with one or more embodiments.

FIG. 1 illustrates a system 100 for configuring interconnections between one or more components of an integrated circuit based on an external signal in order to access one or more specific portions of the integrated circuit. As illustrated in FIG. 1, system 100 may include server(s) 102, network/client device 104 (or network/client devices 104a-104n), database 132, network 150, or other components. Server 102 may include a data retrieval subsystem 112, a communication subsystem 114, a signal generation subsystem 116, or other components. Each network device 104 may include any type of mobile terminal, fixed terminal, or other device. By way of example, network device 104 may include a desktop computer, a notebook computer, a tablet computer, a smartphone, a wearable device, a server, a mobile device, or other network device. Users may, for instance, utilize one or more network devices 104 to interact with one another, one or more servers 102, or other components of system 100. It should be noted that, while one or more operations are described herein as being performed by particular components of network device 104, those operations may, in some embodiments, be performed by other components of network device 104 or other components of system 100. As an example, while one or more operations are described herein as being performed by components of network device 104, those operations may, in some embodiments, be performed by components of other network devices 104 or server 102. Further, although the database 132 is illustrated as being separate from the server 102 and the network device 104, the database 132 may be located within the network device 104 or server 102.

In some embodiments, sensitive information may be protected from being stolen, compromised, or otherwise improperly used by configuring (or reconfiguring) interconnections between one or more components of an integrated circuit of a network device 104 based on an external signal, thereby allowing one or more specific portions of the integrated circuit of the network device 104 that was previously inaccessible to be accessed. The one or more specific portions of the integrated circuit may be otherwise inaccessible (for example, inaccessible to one or more applications accessed by the network device 104) but for the configuration (or reconfiguration) of one or more components of the integrated circuit of the network device 104. However, in some embodiments, configuration (or reconfiguration) of one or more components of the integrated circuit of the network device 104 may not be needed. In other words, in some embodiments, sensitive information may be protected from being stolen, compromised, or otherwise improperly used by restricting access to one or more portions of an integrated circuit, and allowing access to one or more specific portions of the integrated circuit of the network device 104 that was previously inaccessible to be accessed based on an external signal without the need for configuration (or reconfiguration) of one or more components of the integrated circuit of the network device 104. The one or more portions of the integrated circuit that is accessible based on, for example, an external signal (but otherwise inaccessible to, for example, applications) may correspond to a secure world of an ARM TrustZone and other portions of the integrated circuit that are always accessible may correspond to a non-secure world of an ARM TrustZone. In some embodiments, only some applications may have access to the secure world, while other applications may not have access to such a secure world. Although a lot of the description below is in relation to configuring (or reconfiguring) interconnections between one or more components of an integrated circuit of a network device 104 based on an external signal to access one or more portions of the integrated circuit, it should be understood that an application (which may not otherwise be able to access one or more portions of an integrated circuit of the network device 104) may be able access the one or more portions of the integrated circuit of the network device 104 based on the external signal without configuring (or reconfiguring) interconnections between one or more components of an integrated circuit of a network device 104.

In some embodiments, the network device 104 (or client device 104) may obtain an external signal via a network connection 150 (wired or wireless) from, for example, the server 102. For example, when a network device 104 connects to a network 150 (for example, the network connection may be established based on automatic recognition of the network device 104 or based on entry of network credentials (for example, network name/ID and network key/password) via the network device 104), the server 102 (for example, the signal generation subsystem 116) may generate an external signal and transmit such an external signal to the connected network device 104. In addition to establishing a network connection to the network 150, the server 102 may request credential information (associated, for example, with a user of the network device 104) prior to providing the external signal to the network device 104. Such credential information may include username/password combination, biometric information, etc. Additionally, or alternatively, the external signal may be obtained by the network device 104 via a wired connection or other wireless connection. For example, an external signal may be received via a physical connection (for example, via a USB connection to the network device 104 or any other physical connection with the network device 104) or other wireless connections (for example, wireless connections involving Bluetooth, Infrared, Radio-frequency identification (RFID), or any other wireless connection with the network device 104).

The external signal may be generated based on information associated with the network device 104, information associated with the user of the network device 104 or a user that connects to the server 102 via a network device 104, the properties of the network device 104, the network 150 that the network device 104 connects to, and privileges associated with a user associated with the network device 104 or a user that connects to the server 102 via a network device 104. Such information may either be obtained from database 132 or may be provided by a network device 104 during a connection with the server. For example, the server 102 may identify the network device 104 (for example, based on information retrieved from the database 132 by the data retrieval subsystem 112) and based on such identification, the server 102 may generate an external signal to be sent (for example, via the communication subsystem 114) to the network device 104. In other words, based on the identification of the network device 104, the server 102 may obtain information (from the database 132) related to the configuration of the integrated circuit of the network device 104, and the external signal may be generated based on such information. Each network device's 104 information (for example, configuration information of an integrated circuit of each network device 104) may be stored in the database 132. Alternatively, the external signal may be generated regardless of the identification of the network device 104 and as long as the network device 104 is connected to the network 150. In other words, the generated external signal may or may not be unique to a particular network device 104. Additionally, or alternatively, the external signal may be obtained by the network device 104 from a physically connected device in response to a detection of the physically connected device (for example, a USB device being connected to the network device 104 or any other device that can be physically connected to the network device 104). Additionally, or alternatively, the external signal may be obtained by the network device 104 from a wireless connection with a device (for example, from a device including an RFID tag) based on a detection of the device (for example, detection of the RFID tag).

In some embodiments, such an external signal may include information (for example configuration or reconfiguration information) to configure (or reconfigure) one or more hardware components of an integrated circuit of the network device 104 or an authorization code (or token) so as to allow an application to access a specific portion of the integrated circuit that was previously inaccessible. Additionally, or alternatively, the external signal may include identification information of a user (for example, identification information of a user associated with a device (for example, a USB device or a device that includes an RFID tag)) connected to the network device 104, identification information of a device (for example, a USB device or a device that includes the RFID tag) connected to the network device 104, or a key provided by a device connected to the network device 104. The configuration or reconfiguration information may be instructions on how to reconfigure one or more hardware components of the integrated circuit of the network device 104. The external signal may also include a decryption key (for example, an unlock key). The decryption key may be continuously rotated such that a different decryption key provided to a network device 104 every time the network device 104 connects to the server 102. In other words, the external signal may change each time a network device 104 connects to the server 102. The external signal may be encrypted, and a decryption key may be used to decrypt the information in the external signal. Information included in the external signal may be retrieved from the database 132. The information included in the external signal may be retrieved from the database 132 based on information associated with the network device 104, information associated with the user of the network device 104 or a user that connects to the server 102 via a network device 104, the properties of the network device 104, the network 150 that the network device 104 connects to, and privileges associated with a user associated with the network device 104 or a user that connects to the server 102 via a network device 104. For example, the external signal may include information to configure (or reconfigure) interconnections between one or more hardware components of an integrated circuit of the network device 104 or include other information (for example, an authorization code, key) that signals to an operating system of the network device 104 to allow the one or more applications to access the one or more portions of the integrated circuit without the need for configuring (or reconfiguring) interconnections between one or more hardware components of an integrated circuit of the network device 104. The network device 104 may include an integrated circuit that includes several hardware components. However, one or more such hardware components may be inaccessible to one or more applications accessed by the network device 104. In other words, the network device 104 may store one or more applications in a memory or may access one or more applications from another device 104, server 102, or other devices (not illustrated), and these one or more applications may be unable to access one or more components of the integrated circuit of the network device 104.

However, based on the external signal obtained from the server 102 (which may be obtained, for example, in response to the network device 104 connecting to the network 150), the one or more hardware components (for example, interconnections between the one or more hardware components) of the integrated circuit of the network device 104 may be configured (or reconfigured) such that one or more portions of the integrated circuit that were previously inaccessible are now accessible to the one or more applications. In other words, based on the information (for example, the configuration information) included in the external signal, the one or more hardware components of the integrated circuit of the network device 104 may be reconfigured from a first configuration to a second configuration such that one or more portions of the integrated circuit of the network device 104 that was previously inaccessible is now accessible. In some embodiments, based on such configuration (or reconfigurations), one or more applications may access the one or more portions of the integrated circuit that was previously inaccessible.

Additionally, or alternatively, the external signal obtained from the server 102 may include an authorization code or a key that provides instructions for allowing an application to access one or more portions of the integrated circuit of the network device 104 that were previously inaccessible. For example, the external signal may include an authorization code or a key that provides instructions to an operating system of the network device 104 to allow an application to access one or more portions of the integrated circuit of the network device 104 that were previously inaccessible. In some embodiments, in response to obtaining the external signal from the server 102, the network device 104 may access information stored in its memory based on the external signal and may retrieve such information in order to allow one or more applications to access one or more portions of the integrated circuit of the network device 104 (that would have otherwise been inaccessible). For example, the operating system may use such information to allow one or more applications to access one or more portions of the integrated circuit of the network device 104 (that would have otherwise been inaccessible).

Additionally, or alternatively, in some embodiments, the external signal may include identification information of a user (for example, identification information of a user associated with a device (for example, a USB device or a device that includes an RFID tag)) connected to the network device 104, identification information of a device (for example, a USB device or a device that includes the RFID tag) connected to the network device 104, or a key provided by a device connected to the network device 104 and such identification information or key may be used by the network device 104 (for example, a control device (e.g., microcontroller, circuitry) within the network device 104, SOC 202, or programmable logic device 204/210) to retrieve information (for example, from a memory of the network device 104) to configure (or reconfigure) interconnections between one or more hardware components of an integrated circuit of the network device 104 or to retrieve information (for example, from a memory of the network device 104) that allows the operating system of a network device 104 to provide an application access to one or more portions of the integrated circuit of the network device 104 that was otherwise inaccessible. The information to configure (or reconfigure) interconnections between one or more hardware components of an integrated circuit of the network device 104 (or the information that allows the operating system of a network device 104 to provide an application access to one or more portions of the integrated circuit of the network device 104) may be stored in a volatile memory 226, non-volatile memory 228, or memory 208 and based on the obtained identification information or key from a device (for example, a USB device or a device including an RFID) that connects to the network device 104, the control device of the network device 104 may be able to retrieve the information (for example, from a memory of the network device 104) to configure (or reconfigure) interconnections between one or more hardware components of an integrated circuit of the network device 104 (or to allow an application to access one or more portions of the integrated circuit of the network device 104 without configuring (or reconfiguring) interconnections between one or more hardware components of an integrated circuit of the network device 104).

In some embodiments, accessing one or more portions of the integrated circuit may include accessing data stored in the one or more portions of the integrated circuit or executing one or more applications via the one or more portions of the integrated circuit. For example, based on the reconfiguration of one or more interconnections between one or more hardware components of the integrated circuit of the network device 104, one or more applications may be able to access one or more portions of the integrated circuit such that the one or more applications may be able to access the data stored in the one or more portions of the integrated circuit or may be executed via the one or more portions of the integrated circuit.

In some embodiments, an application may only execute via one or more portions of the integrated circuit of the network device 104. Such one or more portions may be inaccessible to the application until the one or more hardware components of the integrated are configured (or reconfigured) such that one or more portions that was previously inaccessible is now accessible. For example, the application may correspond to an application for accessing sensitive information (for example, sensitive information such company secrets, customer information, etc.) and such an application may only execute via the one or more portions (which is accessible in response to a reconfiguration of one or more hardware components of the integrated circuit of the network device 104) of the integrated circuit of the network device 104. Once the application is able to execute via the one or more portions (which is now accessible and which was previously inaccessible) of the integrated circuit, the application may correspond with, for example, server 102 to view or obtain sensitive information. In other words, in response to a request from the application (executed via the one or more portions of the integrated circuit), the server 102 (for example, data retrieval subsystem 112) may retrieve sensitive information from the database 132 and provide such information to the application accessed and executed via the network device 104. An advantage to allowing an application to execute only via one or more portions of the integrated circuit of the network device 104 is to prevent anyone from gaining access to the sensitive information when the network device 104 is stolen or lost. An application accessed by the network device 104 may only be allowed to be executed via specific portions of the integrated circuit of the network device 104. Accordingly, the application may not be allowed to be executed unless the interconnections between the hardware components are reconfigured such that one or more portions for executing the application that was previously inaccessible are now accessible to the application or the application may not be allowed to be executed unless the application is allowed to access one or more portions of the integrated circuit (e.g., without configuring or reconfiguring interconnections between the hardware components) for executing the application. This ensures that when a network device 104 is lost or stolen, sensitive information is prevented from being accessed because the application cannot be executed without gaining access to the one or more portions of the integrated circuit of the network device 104. The applications may be restricted such that they may only be executed via the one or more portions of the integrated circuit or may only be fully functional via access to the one or more portions of the integrated circuit.

In some embodiments, the application may access data stored in the one or more portions of the integrated circuit. Such data may include an executable file that allows the application to be executed via the one or more portions of the integrated circuit or other portions of the integrated circuit so as to, for example, allow sensitive information to be accessed via the application. In some embodiments, the data stored in the one or more portions of the integrated circuit may be a key that allows the application to be fully accessible via the network device 104, thereby allowing sensitive information to be accessed via the application. This also ensures that when the network device 104 is lost or stolen, sensitive information is prevented from being accessed because the application cannot be executed or fully accessed without gaining access to the one or more portions of the integrated circuit of the network device 104. The applications may be restricted such that they may only be executed via the one or more portions of the integrated circuit or may only be fully functional via access to the one or more portions of the integrated circuit. In some embodiments, the data stored in the one or more portions of the integrated circuit may include information associated with a location of other data in the server 102. In some embodiments, the application may execute (for example, via the one or more portions of the integrated circuit) in order to obtain the other data from the server 102 based on the information associated with the location of the other data in the server 102.

In another example, the application may correspond to a digital cashier's check application and the data stored in the one or more portions of the integrated circuit may correspond to a digital signature of a bank (for approving the cashier's check). In such an example, when the application gains access to the one or more portions of the integrated circuit, the application may gain access to the data such that the data may be used to authorize (or digitally sign) a digital cashier's check (for example, created via the application). Such a digital cashier's check may be transmitted to another network device 104 or the server 102. For instance, when the network device 104 gains access to the network 150, the network device 104 may be provided an external signal to allow the network device 104 to reconfigure one or more hardware components of the integrated circuit of the network device 104 so that the application (for example, the digital cashier's check application via which a user may have initiated the creation of a digital cashier's check) may gain access to one or more portions of the integrated circuit that stores data (for example, data that may be used to digitally authorize or sign a digital cashier's check), thereby allowing the application to digitally sign the digital cashier's check. The digital cashier's check may then be transmitted to another network device 104 or server 102. This ensures a secure way of generating and transmitting a digital cashier's check and also ensures that no one else (who cannot gain access to the one or more portions of the integrated circuit of the network device 104) is able to generate a cashier's check.

Although specific examples have been discussed above, it should be noted that the access to one or more portions of the integrated circuit may allow one or more applications to exchange (transmit or receive) data with one or more other applications accessed via one or more network devices 104. In other words, when an application gains access to one or more portions of the integrated circuit that was not previously accessible, the one or more applications may use the data stored in the one or more portions of the integrated circuit to exchange data (stored data or other data accessed via, for example, server 102) with one or more applications accessed via one or more network devices 104 (for example, the same network device 104 or other network devices 104) or the one or more applications may be executed via the one or more portions of the integrated circuit and such execution may allow the one or more applications to exchange data (stored data or other data accessed via, for example, server 102) with one or more applications accessed via one or more network devices 104 (for example, the same network device 104 or other network devices 104). This ensures secure exchange of data and prevents anyone from gaining access to the data because the application cannot be executed, or the application cannot exchange data without gaining access to the one or more portions of the integrated circuit of the network device 104. The applications may be restricted such that they may only be executed via the one or more portions of the integrated circuit or may only be fully functional via access to the one or more portions of the integrated circuit.

In some embodiments, in response to a trigger, the one or more hardware components of the integrated circuit of the network device 104 may be configured (or reconfigured) to a previous configuration such that the one or more portions of the integrated circuit of the network device 104 that was accessible is now inaccessible. In other words, in response to a trigger, interconnections between the one or more hardware components of the integrated circuit of the network device 104 may be configured (or reconfigured) from the second configuration to the first configuration such that the one or more portions of the integrated circuit that was previously accessible (for example, accessible to one or more applications accessed by the network device 104) is now inaccessible. Alternatively, in response to the trigger, the one or more portions of the integrated circuit of the network device 104 that is accessible (for example, accessible to one or more applications accessed by the network device 104) may become inaccessible without configuring (or reconfiguring) the interconnections between hardware components.

In some embodiments, the trigger may be caused by an elapse of a predetermined amount of time after obtaining the external signal or an elapse of a predetermined amount of time after connecting to the network 150. The external signal may be associated with a specific time limit and after an elapse of such a time limit (for example, after obtaining the external signal), the one or more hardware components of the integrated circuit may be reconfigured to a previous configuration. Alternatively, in some embodiments, the integrated circuit of the network device 104 may be associated with a time limit such that one or more hardware components of the integrated circuit may be reconfigured to a previous configuration in response to the elapse of such time limit (for example, elapse of a time period after obtaining the external signal or after connecting to network 150). The elapse of a predetermined amount of time or time limit may be determined by a clock-based system or based on a loss of charge of a capacitor(s) or battery (or batteries) of the network device 104. This is advantageous in a situation where the network device 104 is either lost or stolen. Because there is a time limit associated with accessing the one or more portions of the integrated circuit that was previously inaccessible, unauthorized access to the one or more portions of the integrated circuit can be prevented, thereby preventing unauthorized access to sensitive or confidential information.

In some embodiments, the trigger may be caused to occur when the signal strength of the network connection 150 (or the signal strength of the external signal) goes below a predetermined threshold. Specifically, in response to the signal strength of the network connection 150 being below the predetermined threshold, the one or more hardware components may be reconfigured such that the one or more portions of the integrated circuit that was previously accessible is now inaccessible. This is advantageous in a situation where the network device 104 is either lost or stolen. Because of an association between signal strength of the network connection 150 (or the signal strength of the external signal) and the configuration of the one or more hardware components of the integrated circuit, unauthorized access to the one or more portions of the integrated circuit can be prevented, thereby preventing unauthorized access to sensitive or confidential information. The trigger may also be caused to occur in response to an obtained external signal. In other words, the network device 104 may receive an external signal (for example, from server 102) and the one or more hardware components of the integrated circuit of the network device 104 may be reconfigured to a previous configuration based on such an external signal. Such an external signal may include information (for example, instructions) related to configuration or reconfiguration of one or more hardware components of the integrated circuit of the network device 104 and may also include a decryption key. Such an external signal may disable access to a portion of the integrated circuit of the network device 104 that was previously accessible.

Figure 2A:
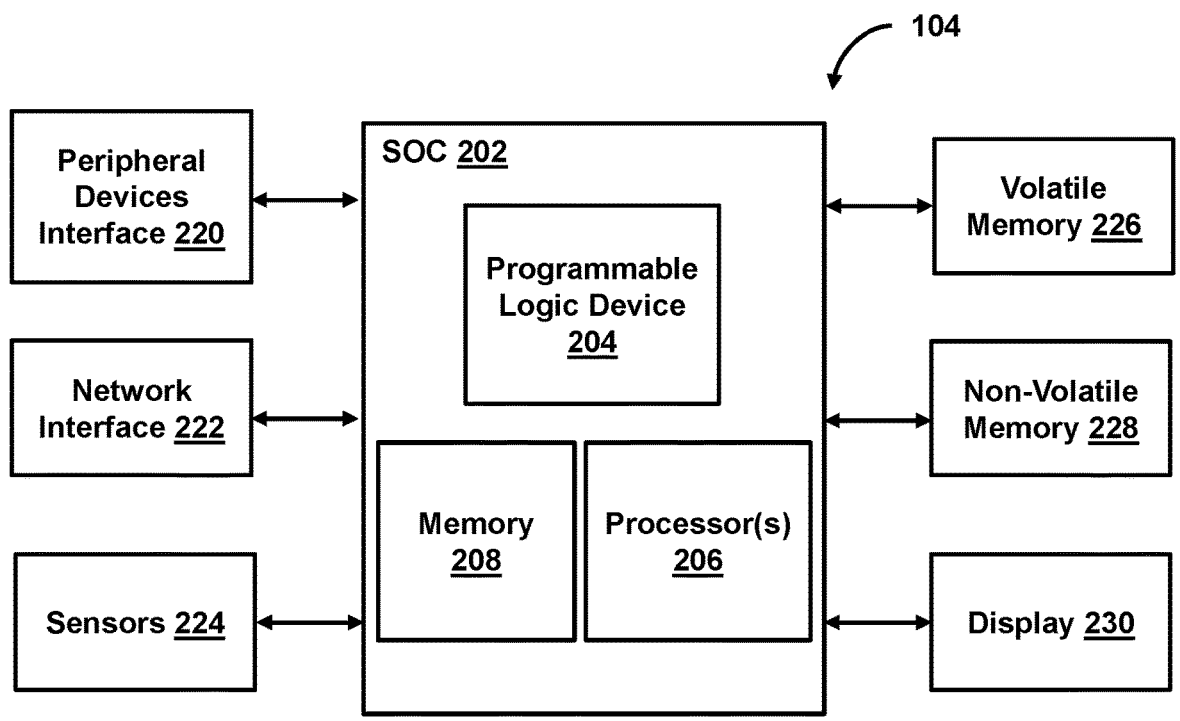
FIG. 2A illustrates an example of a network device, in accordance with one or more embodiments.
Figure 2B:
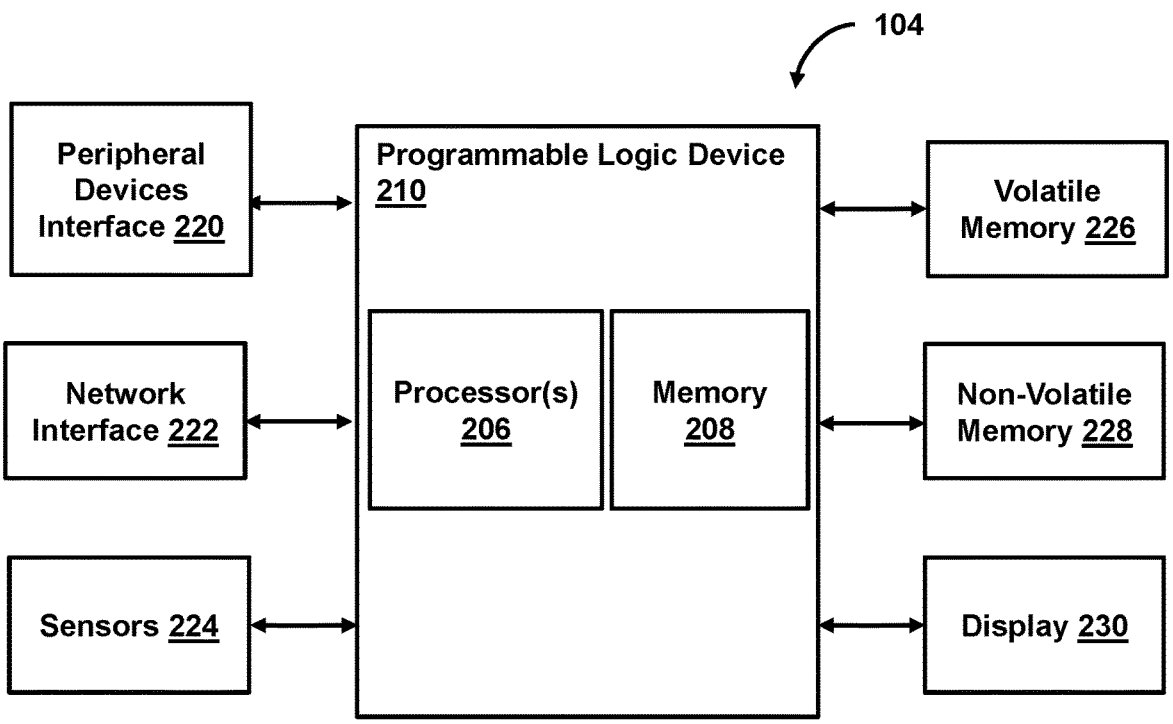
FIG. 2B illustrates another example of a network device, in accordance with one or more embodiments.

FIGS. 2A and 2B illustrate a network device 104 for configuring interconnections between one or more components of an integrated circuit of the network device 104 based on an external signal in order to access one or more specific portions of the integrated circuit of the network device 104. As illustrated in FIG. 2A, the network device 104 may include peripheral devices interface 220, network interface 222, sensors 224, volatile memory 226, non-volatile memory 228, display 230, System on Chip (SOC) 202 including programmable logic device 204, processor 206, and memory 208, or other components. As illustrated in FIG. 2B, the network device 104 may include peripheral devices interface 220, network interface 222, sensors 224, volatile memory 226, non-volatile memory 228, display 230, programmable logic device 210 including processor 206 and memory 208, or other components. The difference between FIGS. 2A and 2B is that FIG. 2A includes a SOC 202, which includes a programmable logic device 204 (for example, field programmable gate arrays (FPGA)), processor 206, and memory 208, and FIG. 2B includes programmable logic device 210 (for example, field programmable gate arrays (FPGA)), which includes processor 206 and memory 208. It should be noted that programmable logic device 204 may also include a processor or memory.

Figure 3A:
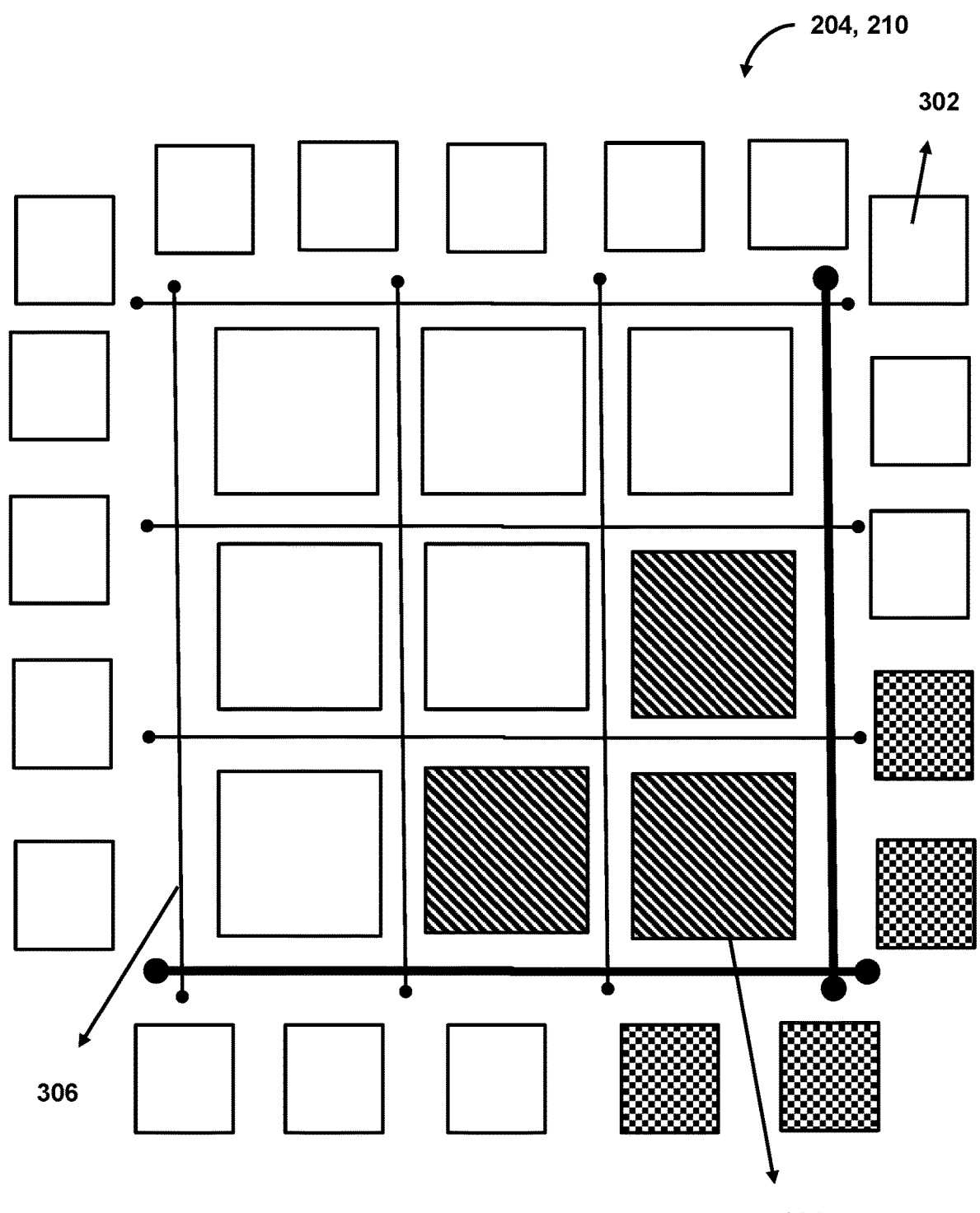
FIG. 3A illustrates a first configuration of the programmable logic device, in accordance with one or more embodiments.
Figure 3B:
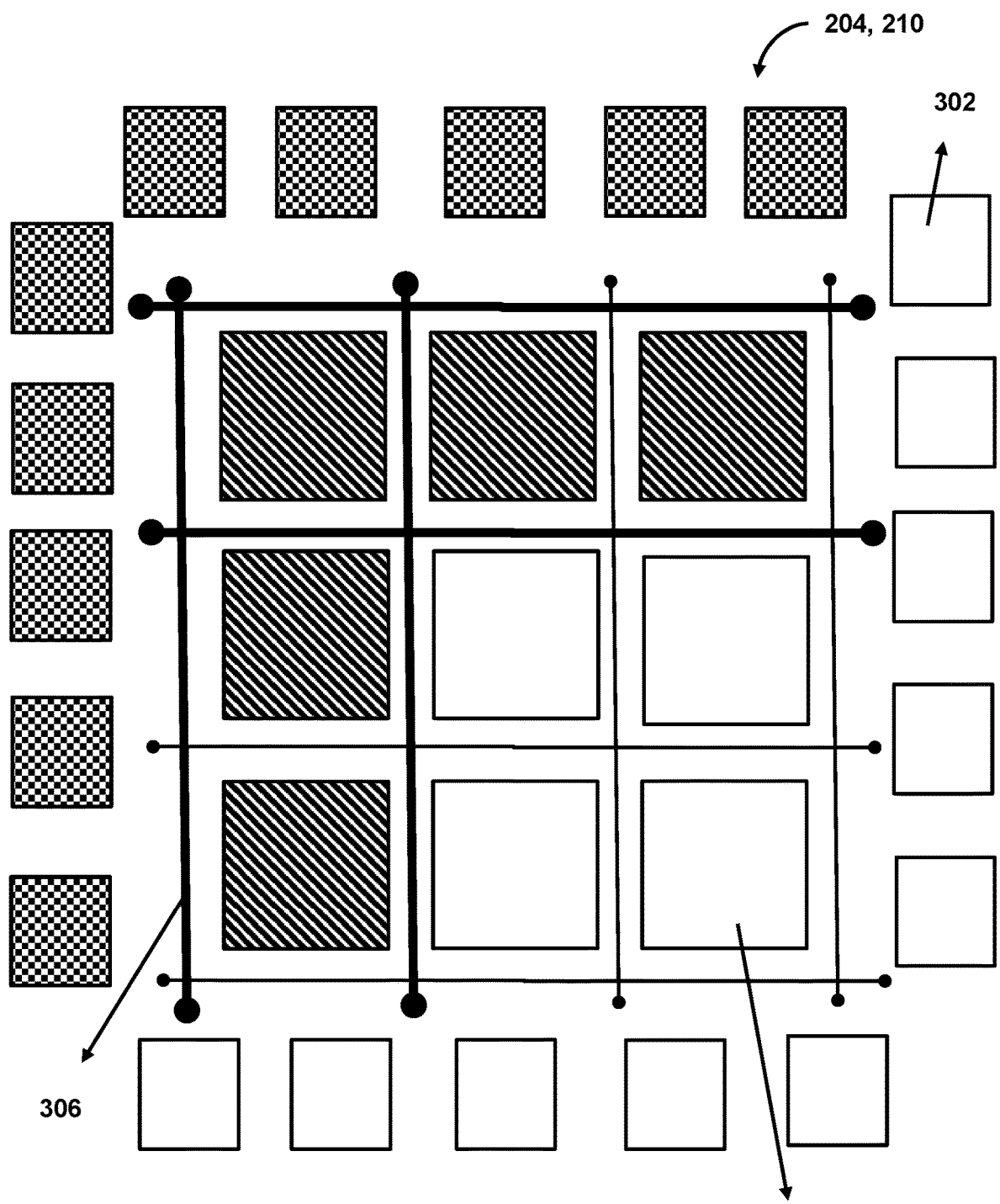
FIG. 3B illustrates a second configuration of the programmable logic device, in accordance with one or more embodiments.

One or more hardware components of the programmable logic device 204 or 210 are illustrated in FIGS. 3A and 3B. FIGS. 3A and 3B illustrate the programmable logic device 204 or 210 including Input/Output (I/O) blocks (or pads) 302, logic blocks 304, and routing fabric (or routing channels) 306. The programmable logic device 204/210 may also include clock circuitry and logic resources (e.g., arithmetic logic units (ALUs), memory, and or decoders). FIG. 3A illustrates a first configuration of the programmable logic device 204 or 210 and FIG. 3B illustrates a second configuration of the programmable logic device 204 or 210. A logic block 304 may provide computation and storage elements used in digital systems. A logic block 304 may include programmable combinational logic, flip-flops, and some fast carry logic to reduce area and delay cost. The programmable logic devices 204 and 210 may include a heterogeneous mixture of different logic blocks 304 like dedicated memory blocks and multiplexers. Configuration memory may be used throughout the logic blocks 304 to control the specific function of each element. The routing fabric (or routing channels) 306 may establish a connection between logic blocks 304 and the I/O blocks 302. The routing fabric 306 may include multiplexers, pass transistors, and tri-state buffers. Pass transistors and multiplexers may be used in a logic cluster to connect the logic elements of the logic blocks 304. The I/O blocks 302 may be used to interface the logic blocks 304 and the routing fabric (or routing channels) 306 to the external components (for example, components illustrated in FIGS. 2A and 2B other than the programmable logic device 204 and 210).

In some embodiments, one or more hardware components (for example, the logic blocks 304, routing channels 306, or I/O blocks 302) of the SOC 202 in FIG. 2A or one or more hardware components (for example, the logic blocks 304, routing channels 306, or I/O blocks 302) of the programmable logic device 210 may be configured (or reconfigured) such that one or more portions of the SOC 202 or the programmable logic device 210 that was previously inaccessible is now accessible. In some embodiments, the network device 104 may obtain an external signal (for example, via a network interface 222) via a network connection 150 (wired or wireless) from, for example, the server 102. For example, the external signal may be obtained in response to the network device 104 connecting to (or detecting) the network 150, a physical device, or a wireless device. In some embodiments, the external signal may include information (for example configuration or reconfiguration information) to configure (or reconfigure) one or more hardware components of the SOC 202 or the programmable logic device 210. Additionally, or alternatively, in some embodiments, the external signal may include identification information of a user (for example, identification information of a user associated with a device (for example, a USB device or a device that includes an RFID tag)) connected to the network device 104, identification information of a device (for example, a USB device or a device that includes the RFID tag) connected to the network device 104, or a key provided by a device connected to the network device 104 and such identification information or key may be used by the network device 104 (for example, a control device (e.g., microcontroller, circuitry) within the network device 104, SOC 202, or programmable logic device 204/210) to retrieve information (for example, from a memory of the network device 104) to configure (or reconfigure) interconnections between one or more hardware components of an integrated circuit of the network device 104.

Figure 4A:
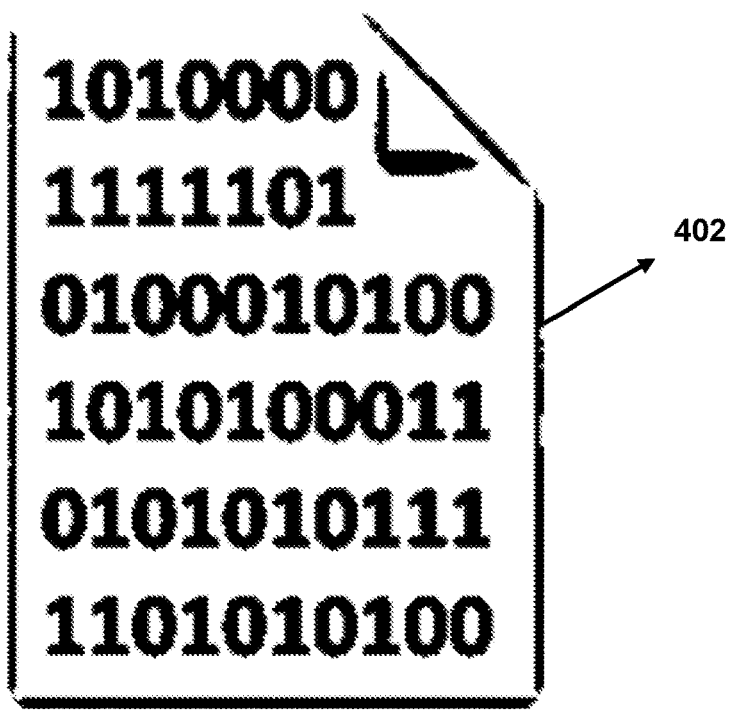
FIG. 4A illustrates an example of a bitstream file, in accordance with one or more embodiments.
Figure 4B:
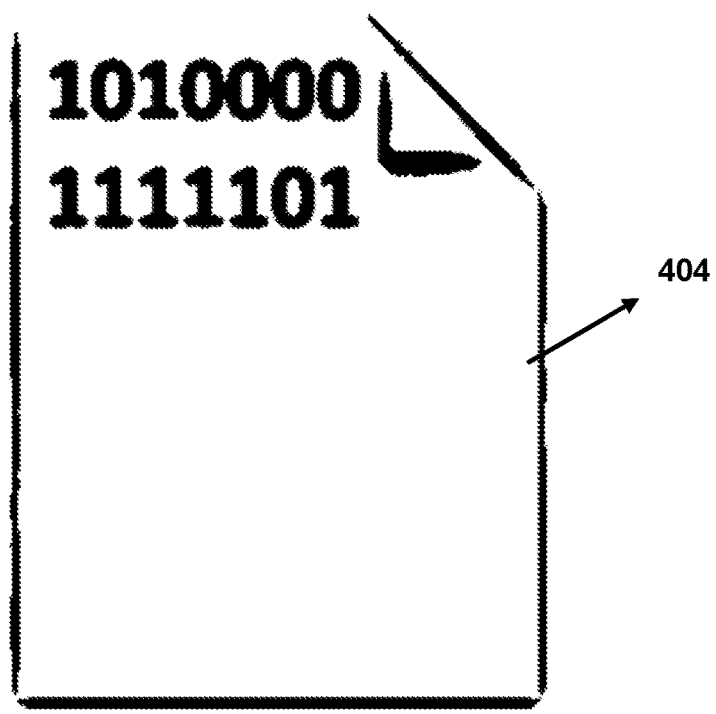
FIG. 4B illustrates another example of a bitstream file, in accordance with one or more embodiments.

FIGS. 4A and 4B illustrate bitstream files 402 and 404 (for example, which includes configuration information) used to configure the one or more components of the integrated circuit. For example, the bitstream file may include information to configure (or reconfigure) interconnections between one or more logic blocks 304 of the programmable logic device 204/210 of the network device 104. FIG. 4A illustrates a full bitstream file 402 for fully configuring (or reconfiguring) the one or more components of the integrated circuit of the network device 104 and FIG. 4B illustrates a partial bitstream file 404 for partial configuration (or reconfiguration) of the one or more components of the integrated circuit of the network device 104. The bitstream file 402 or 404 may be obtained via the external signal or may be retrieved from a memory of the network device 104 based on the obtained external signal.

As illustrated in FIG. 3A, the one or more components (for example, the logic blocks 304, routing channels 306, or I/O blocks 302) of the programmable logic device 204/210 may be configured such that one or more logic blocks 304 (for example, logic blocks 304 that are illustrated with a pattern in FIG. 3A), one or more I/O blocks 302 (for example, I/O blocks 302 that are illustrated with a pattern in FIG. 3A), and one or more routing channels 306 (for example, routing channels 306 that are illustrated in bold in FIG. 3A) may be accessible to one or more applications, while the other components (for example, the logic blocks 304, routing channels 306, and I/O blocks 302 that are not illustrated with a pattern or in bold) of the programmable logic device 204/210 may be in accessible to the one or more applications accessed via the network device 104. However, in response to an external signal (which may include a bitstream file), the one or more components (for example, the logic blocks 304, routing channels 306, or I/O blocks 302) of the programmable logic device 204/210 may be reconfigured such that one or more portions that was previously inaccessible (for example, the logic blocks 304, routing channels 306, and I/O blocks 302 that are not illustrated with a pattern or in bold in FIG. 3A) are now accessible (for example, the logic blocks 304, routing channels 306, and I/O blocks 302 that are illustrated with a pattern or in bold in FIG. 3B). As illustrated in FIG. 3B, the one or more components (for example, the logic blocks 304, routing channels 306, or I/O blocks 302) of the programmable logic device 204/210 may be configured such that one or more logic blocks 304 (for example, logic blocks 304 that are illustrated with a pattern in FIG. 3B), one or more I/O blocks 302 (for example, I/O blocks 302 that are illustrated with a pattern in FIG. 3B), and one or more routing channels 306 (for example, routing channels 306 that are illustrated in bold in FIG. 3B) that were previously inaccessible are now accessible to one or more applications. In other words, based on the bitstream file, the one or more components of the programmable logic device 204/210 may be reconfigured from a first configuration to a second configuration such that one or more portions of the programmable logic device 204/210 of the network device 104 that was previously inaccessible is now accessible. In some embodiments, based on such configuration (or reconfiguration), one or more applications may access the one or more portions of the programmable logic device 204/210 that was previously inaccessible. The programmable logic device 204/210 may be configured (or reconfigured or customized) using hardware, firmware, and/or software of the network device 104. Such hardware may include a control device (e.g., a microcontroller, circuitry) and the control device may be included in the network device 104, SOC 202, or programmable logic device 204/210. Such firmware or software may include a hardware description language (HDL) and the HDL may be stored in the volatile memory 226, non-volatile memory 228, or memory 208. Libraries are available specifying hardware configurations that can be implemented in the programmable logic device 204/210. The libraries may be stored in the volatile memory 226, non-volatile memory 228, or memory 208. These libraries may specify machine architectures that have different parameters. The architectural parameters can include, for example, bus width (e.g., 8, 16, 32, 64, 128 bits), a number of available registers (e.g., 2, 4, 8, 64, and 128), an amount of cache, and a bandwidth between the cache. The programmable logic device 204/210 may further include specialized digital signal processors (DSP), multi-port memory modules, queues and stacks, interleaver/deinterleaver, microcontrollers (e.g., Xilinx's picoblaz and microblaze), reed-solomon decoders, shifters, and time division multipliers.

In some embodiments, based on the external signal (for example, a bitstream file), the interconnections (for example, routing channels 306) between the logic blocks 304 may be reconfigured such that one or more portions of the programmable logic device 204/210 was previously inaccessible is now accessible. As illustrated in FIG. 3B, logic blocks 304 that are illustrated with a pattern, I/O blocks 302 that are illustrated with a pattern, and routing channels 306 that are illustrated in bold were previously inaccessible and are now accessible in response to the reconfiguration of the programmable logic device 204/210 (which may be in response to the external signal (for example, a bitstream file)). The interconnections (for example, routing channels 306) may be reconfigured between the logic blocks 304 such that certain logic blocks 304 that were previously inaccessible are now accessible to one or more applications. In some embodiments, based on such configuration (or reconfigurations), one or more applications may access the one or more portions of the programmable logic device 204/210 that was previously inaccessible.

As noted above, accessing one or more portions of the integrated circuit may include accessing data stored in the one or more portions of the integrated circuit or executing one or more applications via the one or more portions of the integrated circuit. For example, based on the reconfiguration of one or more interconnections (for example, the routing channels 306) between one or more logic blocks 304 of the programmable logic device 204/210, one or more applications may be able to access certain logic blocks 304 such that the one or more applications may be able to access the data stored in these logic blocks 304 or such that the one or more applications may be executed via these logic blocks 304.

In some embodiments, in response to a trigger, one or more hardware components of the programmable logic device 204/210 may be configured (or reconfigured) to a previous configuration such that the one or more portions of the programmable logic device 204/210 that was accessible is now inaccessible. In other words, in response to a trigger, interconnections (for example, routing channels 306) between the logic blocks 304 may be configured (or reconfigured) from the second configuration (see FIG. 3B) to the first configuration (see FIG. 3A) such that the one or more portions of the programmable logic device 204/210 that was previously accessible (for example, logic blocks 304 that are illustrated with a pattern in FIG. 3B, I/O blocks 302 that are illustrated with a pattern in FIG. 3B, and routing channels 306 that are illustrated as bold in FIG. 3B) is now inaccessible (for example, logic blocks 304 that are illustrated without a pattern in FIG. 3A, I/O blocks 302 that are illustrated without a pattern in FIG. 3A, and routing channels 306 that are not illustrated as bold in FIG. 3A).

In some embodiments, the trigger may be caused by an elapse of a predetermined amount of time after obtaining the external signal (for example, a bitstream file) or an elapse of a predetermined amount of time after connecting to the network 150. The external signal may be associated with a specific time limit and after elapse of such a time limit (after obtaining the external signal), the one or more hardware components of the programmable logic device 204/210 may be reconfigured to a previous configuration (for example, from configuration in FIG. 3B to configuration in FIG. 3A). Alternatively, in some embodiments, the programmable logic device 204/210 may be associated with a time limit such that one or more hardware components of the programmable logic device 204/210 may be reconfigured to a previous configuration in response to an elapse of such time limit (for example, elapse of a time period after obtaining the external signal or after connecting to network 150). The elapse of a predetermined amount of time or time limit may be determined by a clock-based system or based on a loss of charge of a capacitor(s) or battery (or batteries) of the network device 104 (for example, SOC 202 or programmable logic device 210). This is advantageous in a situation where the network device 104 is either lost or stolen. Because there is a time limit associated with accessing the one or more portions of the programmable logic device 204/210 that was previously inaccessible, unauthorized access to the one or more portions of the programmable logic device 204/210 can be prevented, thereby preventing unauthorized access to sensitive or confidential information.

In some embodiments, the trigger may be caused to occur when a signal strength of the network connection 150 (or the signal strength of the external signal) is below a predetermined threshold. Specifically, in response to the signal strength of the network connection 150 being below the predetermined threshold, one or more hardware components may be reconfigured such that the one or more portions of the programmable logic device 204/210 that was previously accessible is now inaccessible. This is advantageous in a situation where the network device 104 is either lost or stolen. Because of an association between signal strength of the network connection 150 (or the signal strength of the external signal) and the configuration of the one or more hardware components of the programmable logic device 204/210, unauthorized access to the one or more portions of the programmable logic device 204/210 can be prevented, thereby preventing unauthorized access to sensitive or confidential information.

Example Flowcharts

The processing operations of the methods presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 5:
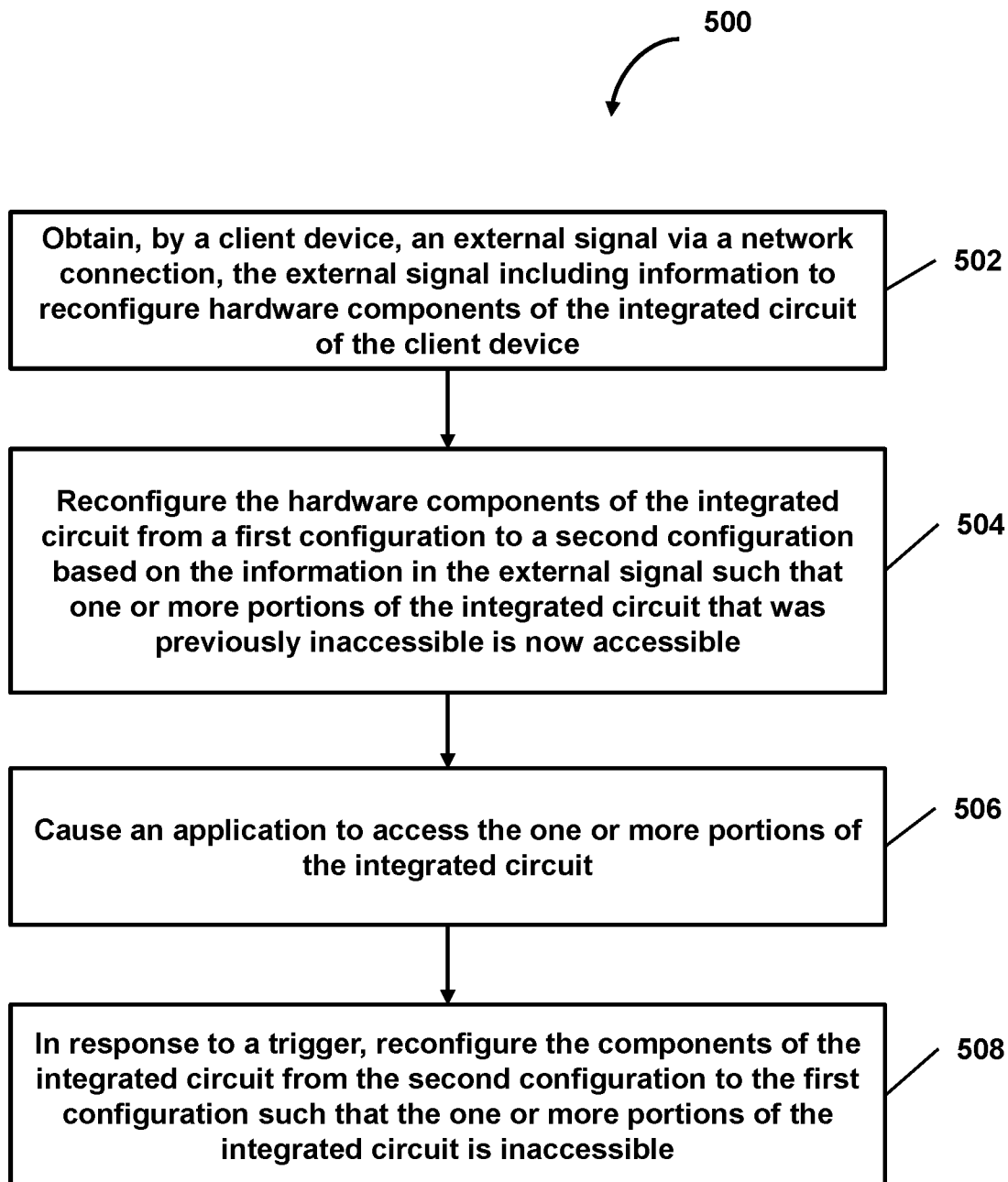
FIG. 5 illustrates an example flowchart describing a method for reconfiguring one or more components of an integrated circuit, in accordance with one or more embodiments.

FIG. 5 illustrates an example flowchart 500 describing a method for reconfiguring one or more components of an integrated circuit. In step 502, a client device may obtain an external signal via a network connection. For example, when the client device connects to a network, a server may generate the external signal and transmit such external signal to the client device. Additionally, or alternatively, the external signal may be obtained by the client device from a physically connected device in response to a detection of the physically connected device (for example, a USB device being connected to the client device or any other device that can be physically connected to the client device). Additionally, or alternatively, the external signal may be obtained by the client device from a wireless connection with a device (for example, from a device including an RFID tag) based on a detection of the device (for example, detection of the RFID tag). The external signal may be generated based on information associated with the client device or information associated with the user of the client device. The external signal may include information to reconfigure hardware components of the integrated circuit of the client device. For example, the external signal may include information to configure (or reconfigure) interconnections between one or more hardware components of an integrated circuit of the client device. Additionally, or alternatively, in some embodiments, the external signal may include identification information of a user (for example, identification information of a user associated with a device (for example, a USB device or a device that includes an RFID tag)) connected to the client device, identification information of a device (for example, a USB device or a device that includes the RFID tag) connected to the client device, or a key provided by a device connected to the client device and such identification information or key may be used by the client device (for example, a control device (e.g., microcontroller, circuitry) within the client device) to retrieve information (for example, from a memory of the client device) to configure (or reconfigure) interconnections between one or more hardware components of an integrated circuit of the client device. The configuration (or reconfiguration) information in the external signal may include a bitstream file.

In step 504, the hardware components of the integrated circuit may be reconfigured from a first configuration to a second configuration based on the information in the external signal (or based on information retrieved from a memory of the client device based on the external signal) such that one or more portions of the integrated circuit that was previously inaccessible is now accessible. For example, the integrated circuit may be reconfigured such that interconnections between one or more hardware components of the integrated circuit may be reconfigured and one or more portions (for example, one or more logic blocks) of the integrated circuit that was previously inaccessible may now be accessible. In step 506, an application may access the one or more portions of the integrated circuit. Specifically, an application that was previously unable to access the one or more portions of the integrated circuit may now access these one or more portions of the integrated circuit based on the reconfiguration of the one or more hardware components of the integrated circuit. Access to the one or more portions of the integrated circuit may allow the application to access data stored in the one or more portions of the integrated circuit or allow the application to be executed via the one or more portions of the integrated circuit. Alternatively, as discussed above, based on the obtained external signal, one or more applications may be allowed to access one or more portions of the integrated circuit that was previously inaccessible without configuring (or reconfiguring) the hardware components of the integrated circuit of the client device.

In step 508, the components of the integrated circuit may be reconfigured from the second configuration to the first configuration such that one or more portions of the integrated circuit that became accessible is now inaccessible. In other words, in response to a trigger, interconnections between the one or more hardware components of the integrated circuit may be configured (or reconfigured) from the second configuration to the first configuration such that the one or more portions of the integrated circuit that was previously accessible (for example, accessible to the application) is now inaccessible. Alternatively, as discussed above, one or more applications that are able to access one or more portions of the integrated circuit may be unable to access the one or more portions of the integrated circuit in response to the trigger without configuring (or reconfiguring) one or more components of the integrated circuit.

Figure 6:
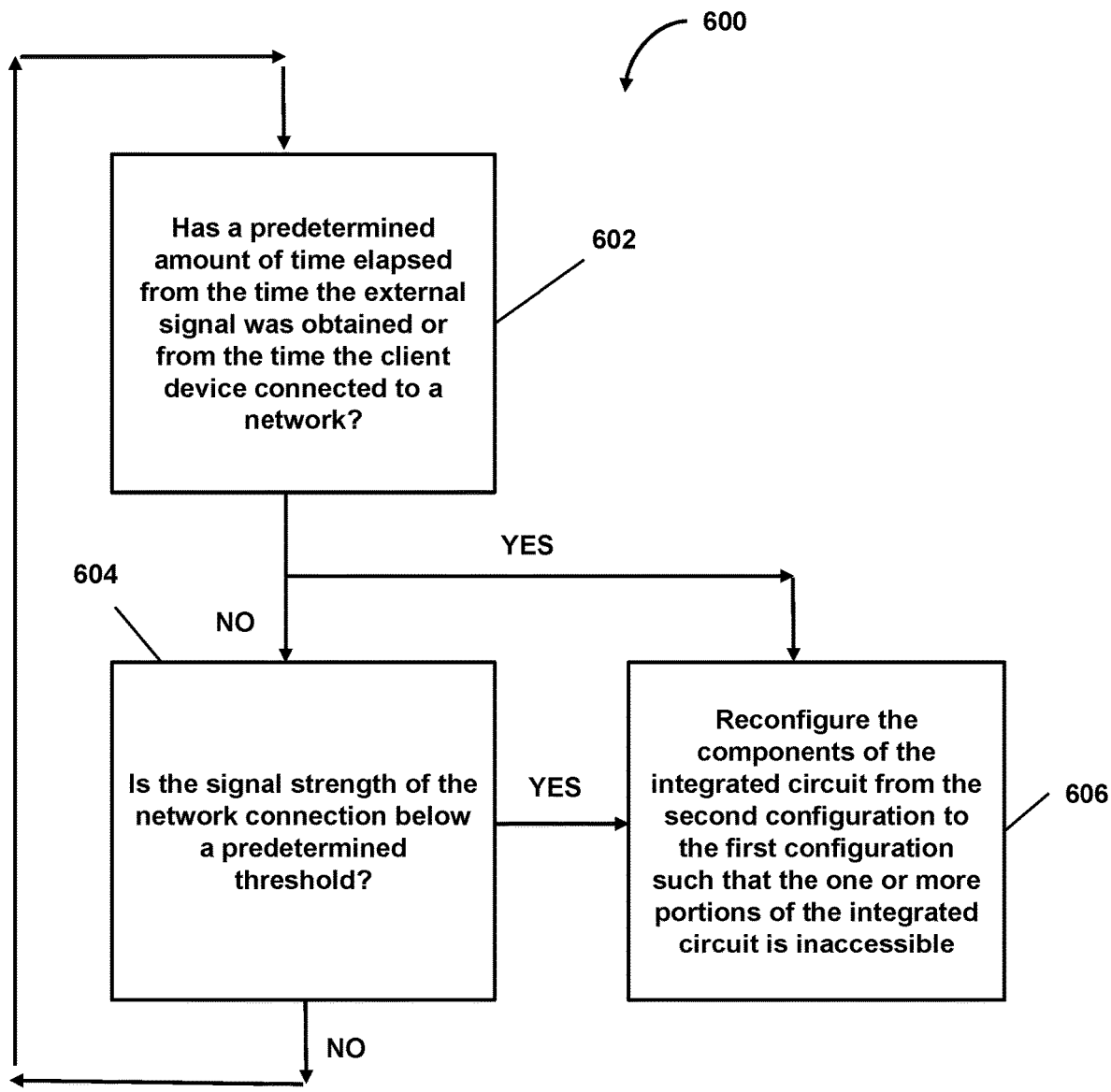
FIG. 6 illustrates an example flowchart describing a method for reconfiguring one or more components of an integrated circuit based on a trigger, in accordance with one or more embodiments.

FIG. 6 illustrates an example flowchart 600 describing a method for reconfiguring one or more components of an integrated circuit based on a trigger. In step 602, a determination may be made as to whether a predetermined amount of time has elapsed from the time the external signal was obtained or from the time the client device connected to a network. When it is determined that the predetermined amount of time has elapsed, the components of the integrated circuit may be reconfigured in step 606 from a second configuration to a first configuration such that one or more portions of the integrated circuit that became accessible is now inaccessible. When it is determined that the predetermined amount of time has not elapsed, a determination may be made as to whether a signal strength of a network connection is below a predetermined threshold in step 604. When it is determined that the signal strength of the network connection is below the predetermined threshold, the components of the integrated circuit may be reconfigured in step 606 from a second configuration to a first configuration such that one or more portions of the integrated circuit that became accessible is now inaccessible. When it is determined that the signal strength of the network connection is not below the predetermined threshold, the steps in FIG. 6 may be repeated. Although FIG. 6 illustrates step 602 being performed before step 604, steps 602 and 604 may be performed in any order or may be performed simultaneously. Alternatively, in step 602, when it is determined that the predetermined amount of time has elapsed, one or more portions of the integrated circuit that became accessible may now become inaccessible to one or more applications without reconfiguring the components of the integrated circuit in step 606. Further, in step 604, when it is determined that the signal strength of the network connection is below the predetermined threshold, one or more portions of the integrated circuit that became accessible may become inaccessible to one or more applications without reconfiguring the components of the integrated circuit in step 606.

In some embodiments, the various computers and subsystems illustrated in FIG. 1 may include one or more computing devices that are programmed to perform the functions described herein. The computing devices may include one or more electronic storages (e.g., database(s) 132, or other electronic storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-116 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-116 described herein is for illustrative purposes, and is not intended to be limiting, as any of subsystems 112-116 may provide more or less functionality than is described. For example, one or more of subsystems 112-116 may be eliminated, and some or all of its functionality may be provided by other ones of subsystems 112-116. As another example, additional subsystems may be programmed to perform some or all of the functionality attributed herein to one of subsystems 112-116.

In some embodiments, processor 206 may include a single processor or a plurality of processors (e.g., distributed processors). Processor 206 may include a central processing unit (CPU) that carries out program instructions to perform the arithmetical, logical, and input/output operations of network device 104. Processor 206 may execute code (e.g., processor firmware, a protocol stack, a database management system, an operating system, or a combination thereof) that creates an execution environment for program instructions. Processor 206 may include a programmable processor. Processor 206 may include general or special purpose microprocessors. Processor 206 may receive instructions and data from a memory (e.g., memory 208, volatile memory 226, or non-volatile memory 228). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Network device 104 may include a plurality of computing devices (e.g., distributed computer systems) to implement various processing functions.

Memory 208, volatile memory 226, and non-volatile memory 228 may be configured to store program instructions or data. Program instructions may be executable by a processor (e.g., one or more of processors 206) to implement one or more embodiments of the present techniques. Instructions may include modules of computer program instructions for implementing one or more techniques described herein with regard to various processing modules. Program instructions may include a computer program (which in certain forms is known as a program, software, software application, application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

Memory 208, volatile memory 226, and non-volatile memory 228 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. Memory 208, volatile memory 226, and non-volatile memory 228 may include a non-transitory computer readable storage medium that may have program instructions stored thereon that are executable by a computer processor (e.g., one or more of processors 206) to cause the subject matter and the functional operations described herein. A memory (e.g., memory 208, volatile memory 226, and non-volatile memory 228) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

Display 230 of the network device 104 may be a liquid crystal display (LCD), an Organic light-emitting diode (OLED) display, or a Retina Display. The display 230 may be a touchscreen display that acts as an input device by responding to a user's touch. The display 230 may display a plurality of user interfaces of a plurality of applications executed on or accessed via the network device 104.

Network interface 222 may include a network adapter that provides for connection of the network device 104 to a network (for example, network 150). Network interface 222 may facilitate data exchange between network device 104 and other devices (for example, other network device 104 or server 102) connected to the network 150. Network interface 222 may support wireless communication. The network 150 may include an electronic communication network, such as the Internet, a local area network (LAN), a wide area network (WAN), a cellular communications network, or the like. The various components of the network device 104 may be attached through various types of buses, such as a variant of the Peripheral Component Interconnect (PCI) bus standard or the Universal Serial Bus (USB) standard. Sensors 224 may include proximality sensors, accelerometer, gyroscope, digital compass, magnetometer, gps, barometer, biometric sensors (for example, finger print recognition, IRIS (eye) scanning, full facial recognition, voice recognition, signature recognition, etc.), touchscreen sensors, ambient light sensors, pedometer, barcode/QR code sensors, heart rate sensors, thermometer, air humidity sensors, and Geiger counter. Peripheral devices interface 220 may include Input/Output (I/O) interfaces, such as communications (COM), Universal Serial Bus (USB), and serial ports. A SOC 202 may include an electronic substrate system that may include analog, digital, mixed-signal or radio frequency functions. The components of the SOC 202 may include a graphical processing unit (GPU), a central processing unit (CPU) that may be multi-core, and system memory (RAM).

Although the disclosure has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the disclosure contemplates that, to the extent possible, one or more features of any embodiment may be combined with one or more features of any other embodiment. Further, although the above operations have been described as being performed in a centralized manner, it should be understood that the above operations may be performed in a de-centralized manner, using blockchain technology for example.

The present techniques will be better understood with reference to the following enumerated embodiments:

1. A method comprising: obtaining, by a client device, an external signal; based on information in the external signal, causing one or more portions of the integrated circuit that was previously inaccessible to be accessible; and causing an application to access the one or more portions of the integrated circuit.

2. The method of embodiment 1, further comprising: reconfiguring hardware components of an integrated circuit of the client device from a first configuration to a second configuration based on the information in the external signal such that the one or more portions of the integrated circuit that was previously inaccessible is now accessible.

3. The method of any of embodiments 1-2, further comprising: in response to a trigger, reconfiguring the components of the integrated circuit from the second configuration to the first configuration such that the one or more portions of the integrated circuit is inaccessible.

4. The method according any of embodiments 1-3, wherein the external signal is obtained via a network connection and wherein the information in the external signal includes information to reconfigure the hardware components of the integrated circuit.

5. The method of any of embodiments 1-5, wherein the trigger is caused by an elapse of a predetermined amount of time after obtaining the external signal, the method further comprising: in response to the elapse of the predetermined amount of time, reconfiguring the components of the integrated circuit from the second configuration to the first configuration such that the one or more portions of the integrated circuit is inaccessible.

6. The method of any of embodiments 1-5, wherein the trigger is caused when a signal strength of the network connection being below a predetermined threshold, the method further comprising: in response to the signal strength of the network connection being below the predetermined threshold, reconfiguring the components of the integrated circuit from the second configuration to the first configuration such that the one or more portions of the integrated circuit is inaccessible.

7. The method of any of embodiments 1-6, wherein causing the application to access the one or more portions of the integrated circuit includes executing the application via the one or more portions of the integrated circuit.

8. The method of any of embodiments 1-7, further comprising: initiating transfer of data to another client device in response to the execution of the application via the one or more portions of the integrated circuit.

9. The method of any of embodiments 1-8, wherein causing the application to access the one or more portions of the integrated includes causing the application to access data stored in the one or more portions of the integrated circuit.

10. The method of any of embodiments 1-9, wherein the data includes information associated with location of other data in a server, the method further comprising: obtaining, by the client device via execution of the application, the other data from the server based on the information associated with the location of the other data in the server.

11. The method of any of embodiments 1-10, wherein the external signal is obtained in response to the client device gaining access to the network connection.

12. The method of any of embodiments 1-11, wherein the hardware components of the integrated circuit comprise logic blocks of a field programmable gate array (FPGA).

13. The method of any of embodiments 1-12, wherein the external signal is obtained from a device physically or wirelessly connected to the client device, and wherein the information in the external signal includes an identification of the device.

14. The method of any of embodiments 1-13, wherein reconfiguring the hardware components of the integrated circuit from the first configuration to the second configuration based on the information in the external signal includes: retrieving information to reconfigure the hardware components of the integrated circuit based on the identification of the device; and reconfiguring the hardware components of the integrated circuit from the first configuration to the second configuration based on the retrieved information to reconfigure the hardware components of the integrated circuit.

15. The method of any of embodiments 1-14, wherein the information to reconfigure the hardware components of the integrated circuit is retrieved from a memory of the client device.

16. A system, comprising: one or more processors; and memory storing instructions that when executed by the processors cause the processors to effectuate operations comprising those of any of embodiments 1-15.

17. A tangible, non-transitory, machine-readable medium storing instructions that when executed by a data processing apparatus cause the data processing apparatus to perform operations comprising those of any of embodiments 1-15.

What is claimed is:

1. A system for facilitating access to one or more portions of an integrated circuit of a client device based on an external signal, the system comprising:
a client device including circuitry configured to:
obtain an external signal, the external signal being generated based on an identification of the client device and the external signal including a key;
cause an application to access one or more portions of an integrated circuit of the client device in response to the key in the external signal, the one or more portions of the integrated circuit of the client device being otherwise inaccessible to the application; and
in response to a trigger related to a signal strength threshold, cause the one or more portions of the integrated circuit of the client device to be inaccessible to the application,
wherein the trigger is caused when a signal strength of a network connection of the client device is below the signal strength threshold.

2. The system of claim 1, wherein causing the application to access the one or more portions of the integrated circuit includes causing the application to be executed via the one or more portions of the integrated circuit.

3. The system of claim 1, wherein causing the application to access the one or more portions of the integrated circuit includes causing the application to access data stored in the one or more portions of the integrated circuit.

4. A method comprising:
obtaining, by a client device, an external signal, the external signal being generated based on an identification of the client device and the external signal including a key;
causing an application to access one or more hardware components of the client device in response to the key in the external signal, the one or more hardware components of the client device being otherwise inaccessible to the application; and
in response to a trigger related to a signal strength threshold, causing the one or more hardware components of the client device to be inaccessible to the application,
wherein the trigger is caused when a signal strength of a network connection of the client device is below the signal strength threshold.

5. The method of claim 4, wherein the external signal is obtained in response to an establishment of the network connection.

6. The method of claim 4, wherein the external signal is obtained from an other device physically or wirelessly connected to the client device.

7. The method of claim 4, wherein the trigger is caused by an elapse of a threshold amount of time after obtaining the external signal.

8. The method of claim 4, wherein causing the application to access the one or more hardware components of the client device includes causing physical reconfiguration of the one or more hardware components in response to the key in the external signal, the physical reconfiguration enabling the application to access the one or more hardware components.

9. The method of claim 4, wherein causing the application to access the one or more hardware components of the client device includes causing the application to be executed via the one or more hardware components of the client device.

10. The method of claim 4, wherein causing the application to access the one or more hardware components of the client device includes causing the application to access data stored in the one or more hardware components of the client device.

11. One or more non-transitory, computer-readable media storing instructions that, when executed by one or more processors, effectuate operations comprising:
obtaining, by a client device, an external signal, the external signal being generated based on an identification of the client device and the external signal including a key;
causing an application to access one or more hardware components of the client device in response to the key in the external signal, the one or more hardware components of the client device being otherwise inaccessible to the application; and
in response to a trigger related to a signal strength threshold, causing the one or more hardware components of the client device to be inaccessible to the application,
wherein the trigger is caused when a signal strength of a network connection of the client device is below the signal strength threshold.

12. The non-transitory, computer-readable media according to claim 11, wherein the external signal is obtained in response to an establishment of the network connection.

13. The non-transitory, computer-readable media according to claim 11, wherein the external signal is obtained from an other device physically or wirelessly connected to the client device.

14. The non-transitory, computer-readable media according to claim 11, wherein the trigger is caused by an elapse of a threshold amount of time after obtaining the external signal.

15. The non-transitory, computer-readable media according to claim 11, wherein causing the application to access the one or more hardware components of the client device includes causing physical reconfiguration of the one or more hardware components in response to the key in the external signal, the physical reconfiguration enabling the application to access the one or more hardware components.

16. The non-transitory, computer-readable media according to claim 11, wherein causing the application to access the one or more hardware components of the client device includes causing the application to be executed via the one or more hardware components of the client device.

17. The non-transitory, computer-readable media according to claim 11, wherein causing the application to access the one or more hardware components of the client device includes causing the application to access data stored in the one or more hardware components of the client device.

18. The system of claim 1, wherein causing the application to access the one or more portions of the integrated circuit of the client device includes causing physical reconfiguration of the integrated circuit in response to the key in the external signal, the physical reconfiguration enabling the application to access the one or more portions of the integrated circuit.

19. The system of claim 1, wherein the circuitry is configured to:
in response to obtaining the key in the external signal, cause one or more other portions of the integrated circuit of the client device to be inaccessible to the application in connection with causing the one or more portions of the integrated circuit to be accessible to the application; and in response to the trigger related to the signal strength threshold, cause the one or more other portions of the integrated circuit of the client device to be accessible to the application in connection with causing the one or more portions of the integrated circuit of the client device to be inaccessible to the application.

20. The non-transitory, computer-readable media according to claim 11, the operations comprising:
in response to obtaining the key in the external signal, cause one or more other hardware components of the client device to be inaccessible to the application in connection with causing the one or more hardware components of the client device to be accessible to the application; and
in response to the trigger related to the signal strength threshold, cause the one or more other hardware components of the client device to be accessible to the application in connection with causing the one or more hardware components of the client device to be inaccessible to the application.

* * * * *